United States Patent

Harutyunyan

(10) Patent No.: US 8,845,996 B2
(45) Date of Patent: Sep. 30, 2014

(54) PREFERENTIAL GROWTH OF SINGLE-WALLED CARBON NANOTUBES WITH METALLIC CONDUCTIVITY

(75) Inventor: Avetik R. Harutyunyan, Upper Arlington, OH (US)

(73) Assignee: Honda Motor Co., Ltd., Tokyo (JP)

(*) Notice: Subject to any disclaimer, the term of this patent is extended or adjusted under 35 U.S.C. 154(b) by 971 days.

(21) Appl. No.: 12/511,047

(22) Filed: Jul. 28, 2009

(65) Prior Publication Data

US 2010/0034725 A1 Feb. 11, 2010

Related U.S. Application Data

(60) Provisional application No. 61/084,533, filed on Jul. 29, 2008.

(51) Int. Cl.
*D01F 9/127* (2006.01)
*B82Y 40/00* (2011.01)
*B82Y 30/00* (2011.01)
*C01B 31/02* (2006.01)

(52) U.S. Cl.
CPC ............. *C01B 31/0233* (2013.01); *B82Y 40/00* (2013.01); *C01B 2202/02* (2013.01); *B82Y 30/00* (2013.01); *Y10S 977/843* (2013.01)
USPC ..................................... 423/447.3; 977/843

(58) Field of Classification Search
USPC .......... 423/447.3, 447.5, 447.4, 447.6, 447.7, 423/447.8; 977/843, 842; 502/20, 34, 53, 502/55, 56, 514
See application file for complete search history.

(56) References Cited

U.S. PATENT DOCUMENTS

| | | | |
|---|---|---|---|
| 6,183,714 B1 | 2/2001 | Smalley et al. |
| 6,333,016 B1 | 12/2001 | Resasco et al. |
| 6,794,599 B2 | 9/2004 | Kajiura et al. |
| 6,863,942 B2 | 3/2005 | Ren et al. |
| 6,918,284 B2 | 7/2005 | Snow et al. |

(Continued)

FOREIGN PATENT DOCUMENTS

| | | |
|---|---|---|
| EP | 2077251 A1 | 8/2009 |
| JP | 11139815 A | 5/1999 |

(Continued)

OTHER PUBLICATIONS

Bachilo, et al., Narrow (n,m)-Distribution of Single-Walled Carbon Nanotubes Grown Using a Solid Supported Catalyst, J. Am. Chem. Soc. 2003; 125: 11186-11187.*

(Continued)

*Primary Examiner* — Daniel C McCracken
(74) *Attorney, Agent, or Firm* — Capitol City TechLaw, PLLC; Mark E. Duell

(57) ABSTRACT

The present disclosure is directed to a method of producing metallic single-wall carbon nanotubes by treatment of carbon nanotube producing catalysts to obtain the desired catalyst particle size to produce predominantly metallic single wall carbon nanotubes. The treatment of the carbon nanotube producing catalyst particles involves contacting the catalyst particles with a mixture of an inert gas, like He, a reductant, such as $H_2$, and an adsorbate, like water, at an elevated temperature range, for example, at 500° C. to 860° C., for a sufficient time to obtain the catalyst particle size. In some of the present methods, the preferential growth of nanotubes with metallic conductivity of up to 91% has been demonstrated.

20 Claims, 6 Drawing Sheets

(56) References Cited

U.S. PATENT DOCUMENTS

| | | | |
|---|---|---|---|
| 6,939,525 B2 | 9/2005 | Colbert et al. | |
| 7,053,520 B2 | 5/2006 | Zetti et al. | |
| 7,214,361 B2* | 5/2007 | Harutyunyan et al. | 423/447.3 |
| 7,247,897 B2 | 7/2007 | Choi et al. | |
| 2002/0112814 A1 | 8/2002 | Hafner et al. | |
| 2007/0116632 A1* | 5/2007 | Harutyunyan | 423/447.3 |
| 2008/0031804 A1 | 2/2008 | Taki et al. | |
| 2008/0107892 A1 | 5/2008 | Jiao et al. | |
| 2008/0135816 A1 | 6/2008 | Bordere et al. | |
| 2008/0143230 A1 | 6/2008 | Rueger | |
| 2010/0247421 A1* | 9/2010 | Noda et al. | 423/447.3 |
| 2010/0266478 A1 | 10/2010 | Kim et al. | |

FOREIGN PATENT DOCUMENTS

| | | |
|---|---|---|
| WO | 04000728 A1 | 12/2003 |
| WO | 2008016388 A2 | 2/2008 |
| WO | 2008016388 A3 | 2/2008 |
| WO | 2008029927 A1 | 3/2008 |

OTHER PUBLICATIONS

Ahn, Tae-Moon, Sampath Purushothaman, and John K. Tien. 1976. "An Extended Hydrodynamic Theory for Particle Coarsening-II." J. Phys. Chem. Solids. vol. 37, pp. 777-784.

Rao, A. M., P. C. Eklund, Shunji Bandow, A. Thess, and R. E. Smalley. Jul. 17, 1997. "Evidence for Charge Transfer in Doped Carbon Nanotube Bundles from Raman Scattering." Nature. vol. 388, pp. 257-259.

Medeiros-Ribeiro, Gilberto, Alexander M. Bratkovski, Theodore I. Kamins, Douglas A. A. Ohlberg, and R. Stanley Williams. Jan. 16, 1998. "Shape Transition of Germanium Nanocrystals on a Silicon (001) Surface from Pyramids to Domes." Science. vol. 279, pp. 353-355.

Kataura, H., Y. Kumazawa, Y. Maniwa, I. Umezu, S. Suzuki, Y. Ohtsuka, and Y. Achiba. 1999. "Optical Properties of Single-Wall Carbon Nanotubes." Synthetic Metals. vol. 103, pp. 2555-2558.

Collins, Philip G., Michael S. Arnold, and Phaedon Avouris. Apr. 27, 2001. "Engineering Carbon Nanotubes and Nanotube Circuits Using Electrical Breakdown." Science. vol. 292, pp. 706-709.

Avouris, Phaedon. 2002. "Molecular Electronics with Carbon Nanotubes." Accounts of Chemical Research. vol. 35, No. 12, pp. 1026-1034.

Baughman, Ray H., Anvar A. Zakhidov, and Walt A. de Heer. Aug. 2, 2002. "Carbon Nanotubes—the Route Toward Applications." Science. vol. 297, pp. 787-792.

Bachilo, Sergei M., Leandro Balzano, Jose E. Herrara, Francisco Pompeo, Daniel E. Resasco, and R. Bruce Weisman. 2003. "Narrow (n,m)-Distribution of Single-Walled Carbon Nanotubes Grown Using a Solid Supported Catalyst." J. Am. Chem. Soc. vol. 125, pp. 11186-11187.

Hansen, Poul L., Jakob B. Wagner, Stig Helveg, Jens R. Rostrup-Nielsen, Bjerne S. Clausen, and Henrik Topsøe. Mar. 15, 2002. "Atom-Resolved Imaging of Dynamic Shape Changes in Supported Copper Nanocrystals." Science. vol. 295, pp. 2053-2055.

Krupke, Ralph, Frank Hennrich, Hilbert v. Löhneysen, and Manfred M. Kappes. Jul. 18, 2003. "Separation of Metallic from Semiconducting Single-Walled Carbon Nanotubes." Science. vol. 301, pp. 344-347.

Strano, Michael S., Christopher A. Dyke, Monica L. Usrey, Paul W. Barone, Mathew J. Allen, Hongwei Shan, Carter Kittrell, Robert H. Hauge, James M. Tour, and Richard E. Smalley. Sep. 12, 2003. "Electronic Structure Control of Single-Walled Carbon Nanotube Functionalization." Science. vol. 301, pp. 1519-1522.

Zheng, Ming, Anand Jagota, Michael S. Strano, Adelina P. Santos, Paul Barone, S. Grace Chou, Bruce A. Diner, Mildred S. Dresselhaus, Robert S. McLean, G. Bibiana Onoa, Georgii G. Samsonidze, Ellen D. Semke, Monica Usrey, and Dennis J. Walls. Nov. 28, 2003 "Structure-Based Carbon Nanotube Sorting by Sequence-Dependent DNA Assembly." Science. vol. 302, pp. 1545-1548.

Ciuparu, Dragos, Yuan Chen, Sangyun Lim, Gary L. Haller, and Lisa Pfefferle. Jan. 15, 2004. "Uniform-Diameter Single-Walled Carbon Nanotubes Catalytically Grown in Cobalt-Incorporated MCM-41." The Journal of Physical Chemistry B. vol. 108, No. 2, pp. 503-507.

Hata, Kenji, Don N. Futaba, Kohei Mizuno, Tatsunori Namai, Motoo Yumura, and Sumio Iijima. Nov. 19, 2004. "Water-Assisted Highly Efficient Synthesis of Impurity-Free Single Walled Carbon Nanotubes." Science. vol. 306, pp. 1362-1364.

Li, Yiming, David Mann, Marco Rolandi, Woong Kim, Ant Ural, Steven Hung, Ali Javey, Jien Cao, Dunwei Wang, Erhan Yenilmez, Qian Wang, James F. Gibbons, Yoshio Nishi, and Hongjie Dai. 2004. "Preferential Growth of Semiconducting Single-Walled Carbon Nanotubes by a Plasma Enhanced CVD Method." Nano Letters. vol. 4, No. 2, pp. 317-321.

Sansonidze, Ge. G., R. Saito, N. Kobayashi, A. Grüneis, J. Jiang, A. Jorio, S. G. Chou, G. Dresselhaus, and M. S. Dresselhaus. Dec. 6, 2004. "Family Behavior of the Optical Transition Energies in Single-Wall Carbon Nanotubes of Smaller Diameters." Applied Physics Letters. vol. 85, No. 23, pp. 5703-5705.

Dresselhaus, M. S., G. Dresselhaus, R. Saito, and A. Jorio. 2005. "Raman Spectroscopy of Carbon Nanotubes." Physics Reports. vol. 409, pp. 47-99.

Maultzsch, J., H. Telg, S. Reich, and C. Thomsen. 2005. "Radial Breathing Mode of Single-Walled Carbon Nanotubes: Optical Transition Energies and Chiral-Idex Assignment." Physical Review B. vol. 72, pp. 205438.

Wang, Yuhuang, Myung Jong Kim, Hongwei Shan, Carter Kittrell, Hua Fan, Lars M. Ericson, Wen-Fang Hwang, Sivaram Arepalli, Robert H. Huage, and Richard E. Smalley. Jun. 2005. "Continued Growth of Single-Walled Carbon Nanotubes." Nano Letters. vol. 5, No. 6, pp. 997-1002.

Arnold, Michael S., Alexander A. Green, James F. Hulvat, Samuel I. Stupp, and Mark C. Hersam. Oct. 2006. "Sorting Carbon Nanotubes by Electronic Structure Using Density Differentiation." Nature Nanotechnology. vol. 1, pp. 60-65.

Harutyunyan, Avetik R., Toshio Tokune, Elena Mora, Jung-Woo Yoo, and Arthur J. Epstein. 2006. "Evolution of Catalyst Particle Size During Carbon Single Walled Nanotube Growth and Its Effect on the Tube Characteristics." Journal of Applied Physics. vol. 100, No. 1, pp. 100.

Miyata, Yasumitsu, Yukata Maniwa, and Hiromichi Kataura. 2006. "Selective Oxidation of Semiconducting Single-Wall Carbon Nanotubes by Hydrogen Peroxide." The Journal of Physical Chemistry B. vol. 110, pp. 25-29.

Rinzler, Andrew G. Oct. 2006. "Sorting out Carbon Nanotube Electronics." Nature Nanotechnology. vol. 1, pp. 17-18.

Smalley, Richard E., Yubao Li, Valerie C. Moore, B. Katherine Price, Ramon Colorado, Jr., Howard K. Schmidt, Robert H. Hauge, Andrew R. Barron, and James M. Tour. 2006. "Single Wall Carbon Nanotube Amplification: En Route to a Type-Specific Growth Mechanism." J. Am. Chem. Soc. vol. 128, pp. 15824-15829.

Gao, Bo, Yongyi Zhang, Jin Zhang, Jing Kong, and Zhongfan Liu. 2008. "Systematic Comparison of the Raman Spectra of Metallic and Semiconducting SWNTs." J. Phys. Chem. C. vol. 112, pp. 8319-8323.

Qu, Liangti, Feng Du, and Liming Dai. 2008. "Preferential Syntheses of Semiconducting Vertically Aligned Single-Walled Carbon Nanotubes for Direct Use in FETs." Nano Letters. vol. 8, pp. 2682-2687.

Amama, Placidus B., Cary L. Pint, Laura McJilton, Seung Min Kim, Eric A. Stach, P. Terry Murray, Robert H. Hauge, and Benji Maruyama. 2009. "Role of Water in Super Growth of Single-Walled Carbon Nanotube Carpets." Nano Letters. vol. 9, No. 1, pp. 44-49.

Harutyunyan, A.R., Pradhan, B.K., Kim, U.J., Chen, G., and Eklund, P.C., "CVD Synthesis of Single Wall Carbon Nanotubes under "Soft" Conditions," Nanoletters, (Jan. 1, 2002), vol. 2, No. 5, pp. 525-530, ACS, Washington, DC, US.

International Search Report from corresponding PCT/US2009/052018 mailed Nov. 2, 2010.

\* cited by examiner

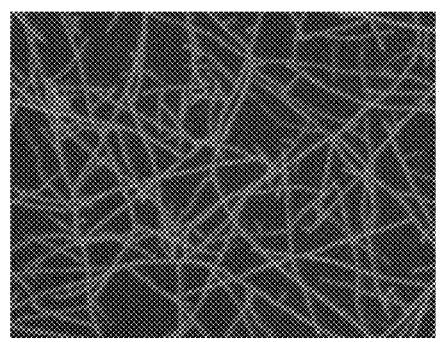 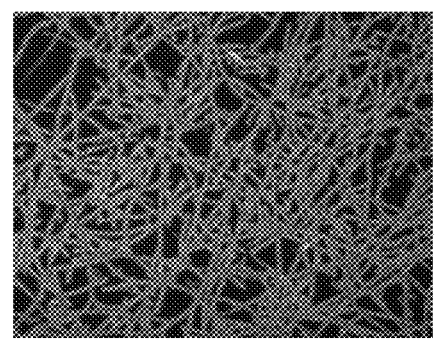
FIG. 1A
FIG. 1B

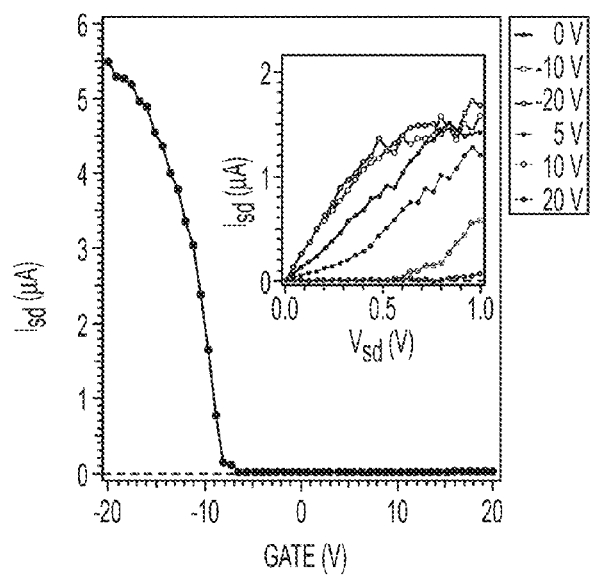
FIG. 4D
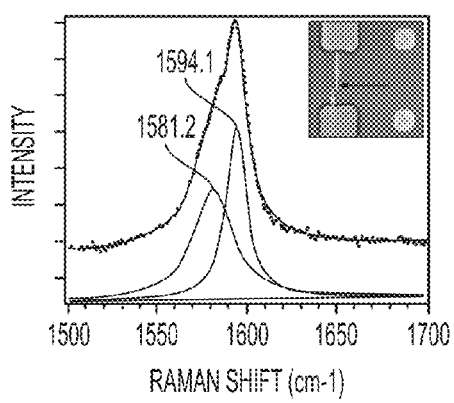 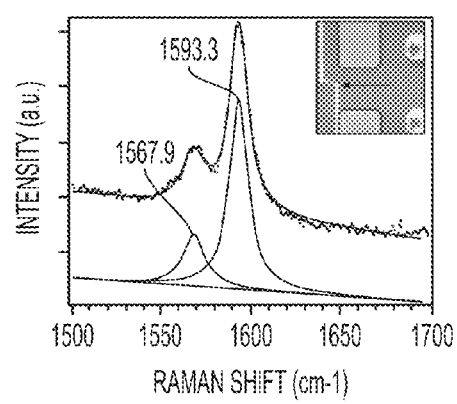
FIG. 4E  FIG. 4F

PREFERENTIAL GROWTH OF SINGLE-WALLED CARBON NANOTUBES WITH METALLIC CONDUCTIVITY

RELATED APPLICATIONS

The present application claims benefit from earlier filed U.S. Provisional Application No. 61/084,533, filed Jul. 29, 2008, which is incorporated herein in its entirety by reference for all purposes.

BACKGROUND

1. Field of the Invention

The present disclosure relates to synthesis methods of preferentially growing single-walled carbon nanotubes ("SWNT"s) with metallic conductivity. Selective growth of SWNTs, particularly with metallic conductivity, is a most challenging obstacle in the synthesis of nanomaterials, and such growth is crucial for high performance electronics. Although significant efforts have been made to separate semiconducting from metallic nanotubes from a single synthesis, or to enrich nanotube material with one type of nanotube, development of a direct controllable growth method has been evasive. As a result, no method exists to date to selectively grow nanotubes of a particular chirality.

2. Description of the Related Art

Despite their unique electronic properties, carbon nanotubes have yet to see ubiquitous application in electronic devices. The electronic properties of carbon nanotubes are related to their structure, most specifically to the exact bonding configuration (known as its "chirality"). However, no established synthesis method exists to grow a population of nanotubes of a particular chirality and, importantly, it is also unclear as to what factors determine chirality at the instant of nanotube nucleation.

There have been significant achievements in separating SWNTs according to their conductivity and also in enriching the distribution of nanotubes with a specific conductivity. However, there have been a few reports regarding direct control over nanotube structure during growth. The fact that SWNTs with narrow chiral distributions have been successfully grown indicates that there may be a specific mechanism which controls chirality. The concept of amplifying existing SWNT distributions by "seeding" growth from another nanotube with well-defined chirality has also been proposed; however, evidence for the maintenance of chirality has not yet been reported. The preferential growth of nearly 90% to 96% of semiconducting SWNTs by plasma-enhanced CVD has been reported, but the mechanism that leads to this selectivity remains unclear.

SUMMARY OF THE PRESENT DISCLOSURE

The present disclosure includes a method of producing metallic single-wall carbon nanotubes by providing a plurality of carbon nanotube producing catalyst particles and a gaseous carbon source, then treating the plurality of carbon nanotube producing catalyst particles to obtain the desired catalyst particle size to produce predominantly metallic single wall carbon nanotubes. The gaseous carbon source is then contacted with the treated plurality of carbon nanotube producing catalyst particles, and metallic single-wall carbon nanotubes are produced. More specifically, the treatment of the carbon nanotube producing catalyst particles involves contacting the catalyst particles with a mixture of an inert gas, a reductant, and an adsorbate at an elevated temperature for a sufficient time to obtain the desired catalyst particle size. Examples of inert gas include helium, a reductant can be hydrogen and a suitable adsorbate can be water.

In some embodiments of the present teachings, preferential growth of nanotubes with metallic conductivity of up to 91% in the presence of He inert gas with hydrogen and water present. This is a yield that is about three times higher than would be estimated for a random chirality distribution.

The present disclosure also includes a method of preparing metallic single-wall carbon nanotubes by dispersing an Fe-containing catalyst on a substrate, reducing the catalyst with a gaseous mixture including an inert gas, contacting the reduced catalyst with a gaseous carbon source, and producing metallic single-wall carbon nanotubes.

The method can utilize as a carbon source at least one member selected from the group consisting of methane, ethane, propane, butane, pentane, their derivatives, and mixtures thereof. In some embodiments of the method, methane can be the carbon source. Suitable inert gases can include members selected from the group consisting of He, Ne, Ar, Kr, Xe, and Rn, and mixtures thereof. Of particular interest are methods which utilize He as the inert gas for the carbon source.

The presently disclosed method can utilize various carbon nanotube-producing catalyst formulations including a Fe-containing catalyst dispersed on a silica substrate.

One suitable iron-containing catalyst can have catalyst particles having an average particle diameter ranging from about 0.1 to about 10 nm, or from about 1 to about 5 nm, or from about 2 to about 4 nm.

This disclosure also includes a method of preparing metallic single-wall carbon nanotubes by first dispersing an Fe-containing catalyst on a silica substrate, and then treating the catalyst by heating it to a first elevated temperature under a first inert gas containing atmosphere, contacting the catalyst with a treating gas mixture comprising a second inert gas, a reductant, and an adsorbate at a second elevated temperature to produce a treated catalyst, and removing the treating gas mixture. This treated catalyst is then contacted with a gaseous carbon source which optionally in some cases can be carried by a third inert gas and thereby producing metallic single-wall carbon nanotubes.

The various embodiments of the presently disclosed method can produce predominantly single-wall carbon nanotubes that have metallic conductivity.

BRIEF DESCRIPTION OF THE DRAWINGS

The accompanying drawings, which are included to provide a further understanding of the present teachings and are incorporated in and constitute a part of this specification, illustrate various exemplars of the present teachings and together with the detailed description serve to explain the principles of the present teachings.

In the drawings:

FIGS. 1A and B are scanning electron microscope images of SWNTs on silicon substrate grown from preliminarily annealed Fe particles in (A) Ar:$H_2$ (8:2), and (B) He:$H_2$ (8:2) ambient in the presence of $H_2O$ at 860° C., respectively;

2C is the chiral indices assignments of the metallic tubes with the dark circles indicating tubes with chiralities that match closely with the observed RBM peaks, the two dark solid hexagons being the metallic tubes, and the lighter solid hexagons corresponding to the semimetallic tubes.

FIGS. 4C and 4D illustrate the typical electrical behavior for SWNTs, metallic and semiconducting, dependence on gate voltage, respectively. The I-V characteristics for both tubes are shown in the inserts. FIGS. 4E and 4F are the Raman G-band spectrum for metallic SWNT and semiconducting SWNT incorporated in the device, respectively, with the Lorentzian fittings shown. The insets show the optical images of the corresponding devices with arrows indicating the locations of SWNTs, and FIG. 5($a$) is an SEM image of individual nanotubes on a substrate with identification marks, FIGS. 5($b$) and 5($c$) are Raman RBM and G band spectra of individual semiconducting (16,0) SWNT (532 nm excitation), respectively, and FIGS. 5($d$) and 5($e$) are Raman RBM and G band spectra of individual metallic (12,6) SWNT (632.8 nm excitation).

DETAILED DESCRIPTION

Figure 2A:
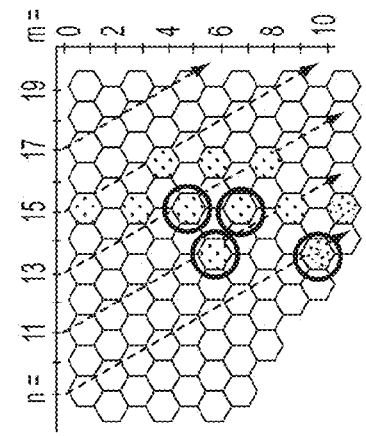
FIG. 2A specifies the populations of tubes that resonant with laser excitation 1.96±0.1 eV. The solid triangles and diamonds represent semiconducting tubes and the solid dots represent metallic tubes, respectively, which contribute to the observed RBM peaks)

The present disclosure includes a method for the production of metallic single-wall carbon nanotubes by providing a plurality of carbon nanotube producing catalyst particles and a gaseous carbon source, then treating the plurality of carbon nanotube producing catalyst particles to obtain the desired catalyst particle size to produce predominantly metallic single wall carbon nanotubes. The gaseous carbon source is then contacted with the treated plurality of carbon nanotube producing catalyst particles, and metallic single-wall carbon nanotubes are produced.

The process of treating the plurality of carbon nanotube producing catalyst particles involves contacting them a mixture of an inert gas, a reductant, and an adsorbate at an elevated temperature for a sufficient time to obtain the desired catalyst particle size. In some cases, the treatment temperature can be an elevated temperature of greater than about 700° C., or other cases greater than about 800° C., and in yet other cases, greater than about 850° C.

In the treatment process, the reductant can be any component that would be able to reduce the catalyst metal from the oxide form to the metallic state, one suitable reductant can be $H_2$.

A suitable adsorbate for the presently disclosed method would be able to be adsorbed onto the facets of the nano-sized catalyst particle, and the resulting bonding will thereby change the surface energy of the catalyst particle. This change in surface energy will accordingly also affect the equilibrium shape of the nano-sized catalyst particle. A suitable adsorbate utilized in the treatment process can be at least one member selected from the group consisting of $H_2O$, CO, and $O_2$.

This change in equilibrium shape of the nano-sized catalyst particle as influenced by the variation of the surface free energy of the facets upon adsorbtion of an adsorbate is in accordance with the Wulff theorem.

The carbon nanotube producing catalyst can be an Fe-containing catalyst. Other suitable catalysts can include nickel, cobalt, molybdenum, copper, and alloys, such as, Fe/Mo and Fe/Cu. Additionally, the desired Fe-containing catalyst particle size can be a particle size ranging from about 0.2 nm to about 5 nm, or in some cases, can be a particle size ranging from about 0.9 nm to about 1.4 nm.

The inert gas used in the present method can be at least one member selected from the group consisting of He, Ne, Ar, Kr, Xe, and Rn. Of most interest are He and Ar, with He providing the highest concentration of metallic SWNTs in the presence of the water.

Another preparation method disclosed by the present teachings can be a method of preparing metallic single-wall carbon nanotubes by dispersing a single-wall carbon nanotube-producing catalyst formulation on a substrate, reducing the catalyst with a gas mixture including helium, treating the catalyst with methane, and thus producing single-wall carbon nanotubes with the majority being metallic single-wall carbon nanotubes.

Here, the single-wall carbon nanotube-producing catalyst formulation can be an Fe-containing catalyst dispersed on a silica substrate with particles having an average particle diameter ranging from about 0.2 to about 5 nm, or from about 1 to about 5 nm, or from about 0.9 to about 1.4 nm.

This method can produce single-wall carbon nanotubes with at least 70%, at least 80%, at least 85%, or at least 90% of those nanotubes have metallic conductivity.

Also disclosed is a method of preparing metallic single-wall carbon nanotubes by dispersing an Fe-containing catalyst having an average particle diameter ranging from about 0.9 to about 1.4 nm on a silica substrate, reducing the catalyst by heating to at least about 500° C. under a reducing atmosphere, contacting at a temperature of at least about 800° C. the reduced catalyst with a gaseous carbon source, and producing single-wall carbon nanotubes with the majority of the single-wall carbon nanotubes being metallic.

In some instances of this method, the gaseous carbon source can be selected from the group consisting of methane, ethane, propane, butane, pentane, their derivatives, and mixtures thereof, with methane of particular interest. In some embodiments of this method, the inert gas can be He.

According to the present disclosure, SWNTs can be grown from Fe nanocatalysts deposited onto a $SiO_2$/Si support, and then annealed in situ in an He containing environment that also can contain $H_2$ and $H_2O$ in various concentrations. Methane can be used as the carbon source at 860° C. FIG. 1A shows an SEM image of SWNTs grown on Fe catalysts annealed at 860° C. under Ar:$H_2$ (8:2) ambient with about 3.5 mTorr of $H_2O$, and FIG. 1B are SWNT's grown on Fe catalysts annealed at 860° C. under He:$H_2$ (8:2 ratio) ambient in the presence of about 3.5 mTorr of $H_2O$. Both samples were under gas flows of about 840 Torr pressure.

Figure 4A:
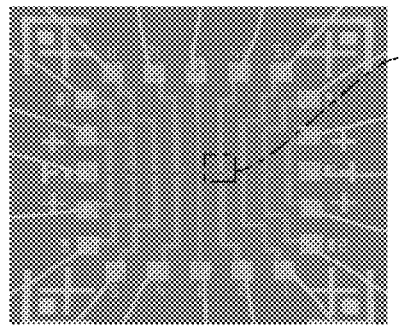
FIGS. 4A and 4B are SEM images of the identification marks and the contacts, respectively. The arrow in FIG. 4B indicates the position of the SWNT incorporated in the device.
Figure 4B:
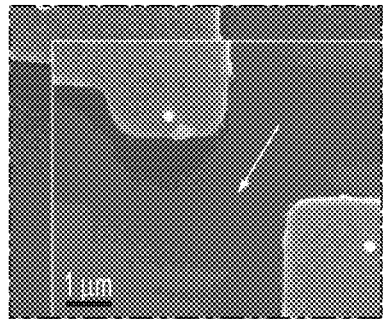

The silica support layer, about 350 nm thick, can be thermally grown on a highly doped p-type Si wafer. In order to locate grown individual SWNTs and define electrical contacts to them, a set of identical Ti/Pt alignment marks were preliminary made on the substrate using photolithography (FIGS. 4A and 5($a$)) following with special grid patterns.

In some of the present methods, the catalyst particles can be obtained by immersing the substrate into a solution of 0.5 mg Fe(NO$_3$)$_3$ in 20 ml isopropanol, followed by dipping the substrate in hexane and drying under flowing nitrogen.

The catalyst preparation procedure and parameters aimed to prepare the nanoparticles with an appropriate size range (from about 0.2 to 5 nm) and density to avoid their agglomeration under nanotube synthesis conditions. Before SWNT growth, the catalyst particles can be reduced at 500° C. for 10 min. The temperature can then be increased to 860° C. with He/$H_2$ flowing through the reactor (160 sccm). Once this temperature is established, $CH_4$ can be introduced in the system for a sufficient time, for example 5 minutes, at a flow rate of 300 sccm. The reactor can then be cooled under flowing inert gas (He or Ar).

Figure 5A:
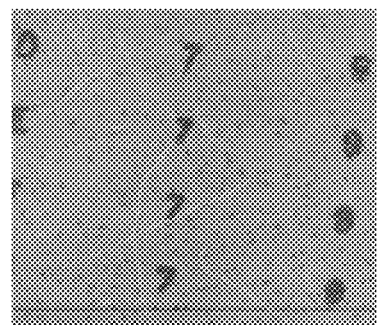
Figure 5B:
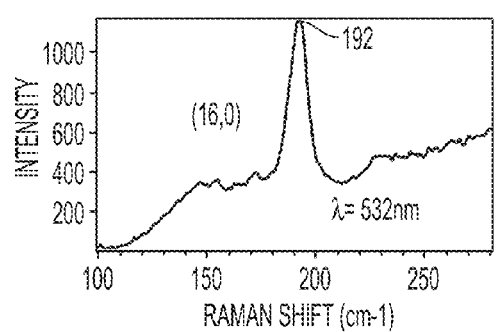
Figure 5C:
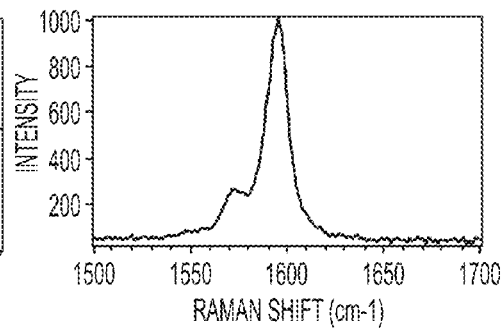
Figure 5D:
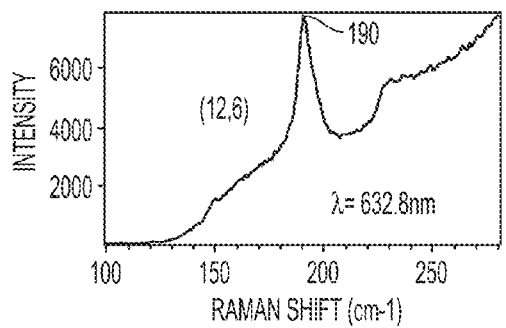
Figure 5E:
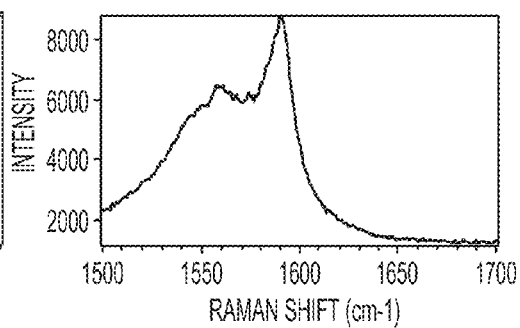

The grown individual tubes can be characterized by Raman spectroscopy (with excitation wavelengths 532, 632.8 and 785 nm), to reveal the presence of metallic and semiconducting tubes (FIGS. 5b, c, and d, e). The conductivities of the tubes were assigned based on field effect transistor performance.

For clarification of the abundance of metallic tubes, the electrical characterizations of individual SWCNTs grown under conditions analogous to bulk sample conditions (that is, He:$H_2$ (8:2) in the presence of $H_2O$) were measured. For SWNTs grown under He inert gas in the presence of $H_2O$, the statistics of metallic vs. semiconducting assignment showed that about 90% were metallic nanotubes, and the other about 10% were semiconducting nanotubes. In contrast, those numbers changed to a 76% yield of semiconducting nanotubes and 24% yield of metallic nanotubes when Ar was used as the inert gas.

The tube conductivity assignments were independently confirmed by Raman spectrometry measurements. FIGS. 4E and 4F show two representative Raman spectra taken with 532 nm laser excitation, one from a metallic nanotube device (FIG. 4E) and one from a semiconducting nanotube device (FIG. 4F) according to the electrical characterizations that are consistent with what has been reported.

Figure 2B:
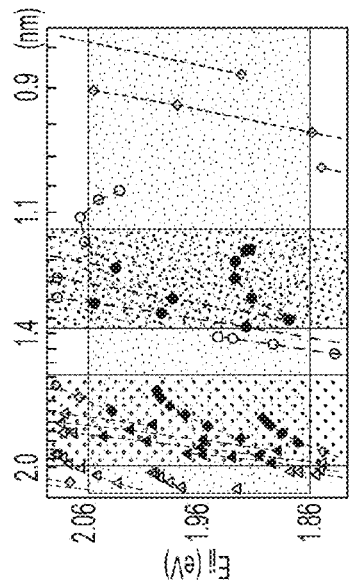
FIG. 2B is the Raman spectra ($\lambda$=632.8 nm) of SWNTs grown from preliminarily annealed Fe catalysts under Ar:$H_2$=(9:1) ambient (S#1) and He:$H_2$ (8:2) ambient (S#2) in the presence of $H_2O$ at 860° C.; FIG.
Figure 2C:
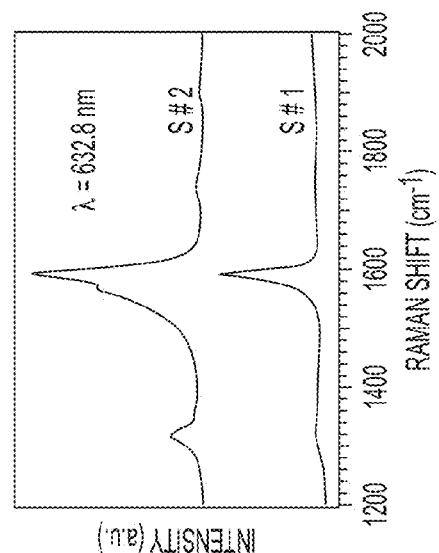
FIG. 2D shows the Raman G-band for the SWNTs samples.

These Raman spectroscopy analyses showed that the ratio of metallic to semiconducting tubes is sensitive to catalyst conditioning history. Systematic studies of SWNTs grown on catalysts that were in situ annealed under different ambient environments were performed. For a reasonable estimation of the ratio of metallic/semiconducting tubes the integral intensities of the Raman radial breathing modes (RBM), which is defined herein as R=Imet/Isem was utilized. Three excitation wavelengths (785, 632.8 and 532 nm) were used for the Raman analyses. Of these $\lambda$=632.8 nm resonates with roughly equal populations of both metallic and semiconducting tubes for the diameter range of the tubes grown in this study (about 0.9-1.85 nm), and can therefore provide a reasonably accurate determination of the ratio of metallic to semiconducting tubes (FIG. 2A). Each spectrum was obtained by averaging 50 individual Raman spectra, measured from different spots of the nanotube sample. The laser beam has a diameter of approximately 1 μm at the sample and the distance between spots is about 10 μm. Two distinguishable regions in the RBM spectrum, one in the range 120-160 $cm^{-1}$, which is assigned to semiconducting tubes (S22), and another band in the range 160-230 $cm^{-1}$ assigned to metallic tubes (M11) were observed. FIG. 2B (S#1 and S#2) shows the Raman RBM spectra of the SWNTs grown on the Fe catalyst annealed under Ar:$H_2$ (9:1) and He:$H_2$ (8:2) for 5 minutes at 860° C. in the presence of about 3.5 mTorr $H_2O$.

The replacement of Ar with He leads to an increase of R from 0.34 to 20.2. Furthermore, with increasing $H_2$ content (Ar:$H_2$ at 8:2) the intensity of the RBM peaks originating from the semiconducting tubes declined while the intensity for the RBM of the metallic tubes increased.

Figure 2D:
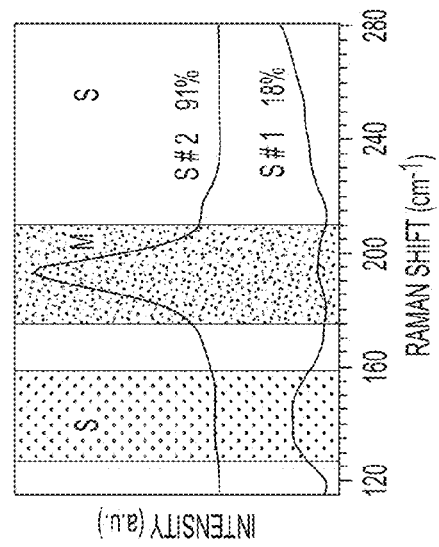

For the sample S#1 the RBM band of the as-grown tubes is dominated by semiconducting tubes (R=0.34, S#1), while in case of sample S#2, the dominant contribution corresponds to metallic tubes R=20.2. The G-band spectra (FIG. 2D) display transitions from Lorenzian to Breit-Wigner-Fano line shapes for the corresponding sequence of the samples. This data further supports the conductivity assignments.

To obtain a reasonable quantitative estimation of the percentage of metallic tubes, the integrated RBM peaks of the Raman spectra of a sample of interest with the spectra of a reference sample. The use of commercially available HiPco SWNTs as the reference sample results in a determination of about 96% metallic tube fraction in the sample with the highest R=20.2 (S#2). In order to obtain a more accurate determination of the metallic/semiconducting ratios the reference samples of well dispersed individual tubes were grown on the same silicon substrate under analogous conditions as the sample S#2 were prepared. Those conditions were He supported ambient with about 3.5 mTorr of $H_2O$. Eight laser excitation wavelengths (488, 514, 532, 570, 582, 610, 647, and 675 nm) were used for assignment of the tube's conductivity, with each laser spot interrogating only one tube.

Figure 4C:
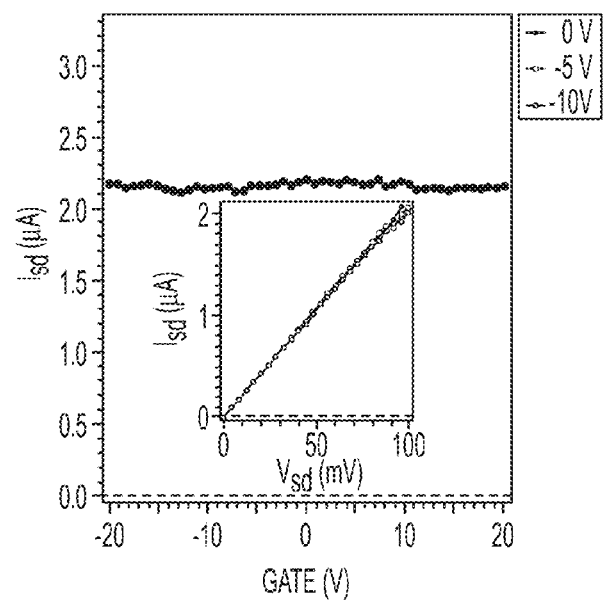

FET devices were prepared from various nanotubes prepared according to the presently disclosed method, and characterized according to their source-drain current ($I_{sd}$) versus gate voltage ($V_g$) behavior (FIG. 4C, D). The statistics of metallic vs. semiconducting assignment showed that about 90% (±5%) were metallic nanotubes and the other 10% were semiconducting nanotubes. These results are in reasonable agreement with the assignments based on Raman spectra results, and also confirmed the presence of approximately 90% metallic tubes.

By using this reference sample, we estimated the variation of the metallic tube contribution in the samples ranged from about 18% up to about 91% (FIG. 2 from S#1 to S#2), depending on the ambient used for catalyst conditioning according to the presently disclosed teachings. The percentages of metallic tubes in the range of 87-91% were present in a few samples with numerous repeated samples having SWNTs with a metallic tube contribution in the range of about 70-85%.

The effect of $H_2$ and $H_2O$ species on conductivity of the nanotubes grown according to the present method were distinguished by a series of experiments using catalyst particles that were in situ annealed in a reductive ($H_2$) ambient supported by Ar or He without the presence of $H_2O$ (<7.6 $10^{-4}$ mTorr). No difference between the use of Ar or He supported ambient was observed.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXPERIMENTAL

Deposition of Identification Grid

Prior to SWNT growth, four grid patterns were defined using E-beam lithography in the region confined by the four alignment marks. This grid allows location of the SWNTs and helps to define the contacts. The substrates with the alignment marks are cleaned by sonicating in acetone, then in isopropanol, and dried in flowing $N_2$. Co-polymer resist Ethyl Lactate (EL 9) was spun at the rate of 6000 rpm on the cleaned substrate and soft baked at 180° C. for 5 minutes. Next, E-beam resist Poly(methyl methacrylate) PMMA (A 8) was spun at the same rate and baked at 180° C. for another 5 minutes. Then, a second E-beam resist PMMA (A 5.5) was spun at the same rate and baked at 180° C. for 15 minutes. The substrate was then transferred inside the SEM chamber and a grid file was run and written by E-beam. The sample was developed using MIBK developer for 90 seconds and then washed with isopropanol, followed by etching using Buffer Oxide Etch solution (Hydrogen Fluoride) for 5-10 seconds. Finally, the E-beam resist and copolymer were removed by sonicating the sample in acetone.

Synthesis of SWNT Growth

SWNTs were grown from Fe nanocatalysts deposited onto silicon support. The silica layer with a thickness of about 350 nm was thermally grown on a highly doped p-type Si wafer. The catalyst particles were obtained by immersing the substrate into a solution containing 0.04 to 0.07 mg $Fe(NO_3)_3$ dissolved in a 1 ml isopropanol solution for 1 to 12 minutes, followed by dipping the substrate in hexane for 10 seconds, and then drying under flowing nitrogen.

Substrates with deposited catalyst particles were placed at the center of a quartz tube furnace and He or in some cases, Ar, was flowed at a rate of 160 sccm up to 500° C. at a ramp rate of about 10° C./min. At this temperature, the gas was then switched to 10% $H_2$ in He (or $Ar/H_2$) flowing at the same total rate of 160 sccm. This $H_2$ in He (or $Ar/H_2$) gas mixture can also contain water. The temperature was maintained at 500° C. for 5 minutes and then ramped up to 890° C. at a rate of 10° C. per minute. The temperature was maintained at 890° C. while $H_2$/He (or $H_2$/Ar) was flowing and $CH_4$ was introduced for 5 minutes at the flow rate of 300 sccm terminating the other gases.

Figure 3A:
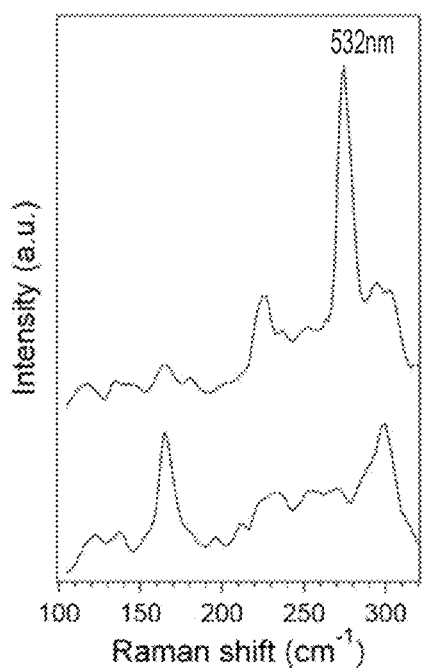
FIG. 3 is the Raman spectra at 532 nm excitation for samples S#1 and S#2.
Figure 3B:
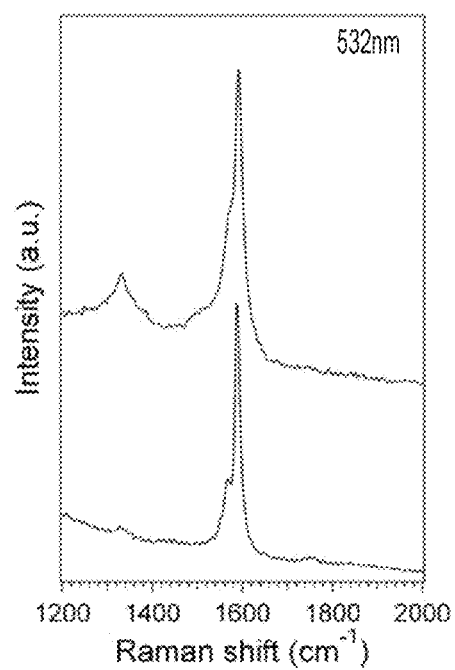

One specific example of the present method for the synthesis of metallic SWNT can be illustrated in the preparation of sample S#2 for which the Raman spectra at various laser excitation wavelengths is provided in FIGS. 2 and 3. Here, a substrate of $SiO_2$/Si, with an $SiO_2$ thickness of about 300 nm was cleaned by first sonicating in acetone for 15 min., then in isopropanol for another 15 min., and finally dried under flowing nitrogen at room temperature. The catalyst was prepared by immersing the clean substrate into a solution composed of 0.04 mg $Fe(NO_3)_3$ $9H_2O$ in 1 mL isopropanol for 12 min., followed by immersion in hexane for 10 seconds, then drying in air at room temperature.

Carbon nanotubes were synthesized by placing the S#2 substrate with catalyst particles thereon into a tube furnace, and increasing the temperature from room temperature to 450° C. at a ramp rate of 60° C./min. under He flowing at 500 sccm. This condition was held for 10 minutes. The gas mixture and temperature were then both changed; the temperature was increased from 450° C. to 500° C. at a ramp rate of 150° C./min., and the gas mixture was changed to 20% $H_2$/80% He and 0.05 ppm $H_2O$ at an overall flow of 700 sccm. This temperature and gas condition was held for 10 minutes. The temperature was then increased to 860° C. at a ramp rate of 15° C./min. At 860° C., all gases were terminated, and after waiting for 1 minute, $CH_4$ gas was introduced, and for 10 minutes flowed at 300 sccm. After the ten minute exposure to $CH_4$, the $CH_4$ was shut off, He was introduced and the system was cooled to room temperature. The SWNTs produced were measured by Raman analysis to be composed of 91% metallic SWNTs.

Raman Measurements

As shown in FIG. 3, the RBMs of samples S#1 and S#2 associated with the 532 nm laser excitation show a similar tendency. For the 785 nm laser excitation (not shown), the samples with high metallic content showed particularly no resonance at 170-230 $cm^{-1}$, which is expected due to the diameter range of the metallic SWNTs.

FET Device Preparation

Following nanotube growth, individual nanotubes were contacted by source and drain electrodes composed of Au/Ti and the Si substrate was used as the back gate. The typical source-drain distance ranged from about 2 to about 3 microns. Before transport property measurements, all devices were annealed at 350° C. for 2 hours under flowing Ar to establish good ohmic contacts. The estimated contact resistance was about 20 to 50 KΩ.

Based on their source-drain current ($I_{sd}$) versus gate voltage ($V_g$) characteristics, the measured nanotubes can be classified into two categories:

(1) Semiconducting—those exhibiting FET behavior, where the current Isd changed more than one order of magnitude when $V_g$ changed from −20 to 20 V, or (2) Metallic—those exhibiting behavior with a current $I_{sd}$ being insensitive to $V_g$. Insensitivity was defined to be less than 50% of Isd variation during $V_g$ changes from −20 to 20V.

$I_{sd}$(max) was maintained at the level of micro-ampere range for all experiments in order to have I-V curves with high-quality signal-to-noise ratio. The same gate oxide thickness and gate voltage range (from −20 to 20V) were utilized in all measurements, although in some instances, larger gate voltages were necessary in order to reach a satisfactory conductivity level.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

I claim:

1. A method of preparing metallic single-wall carbon nanotubes comprising
   dispersing an Fe-containing catalyst on a silica substrate,
   treating the catalyst by heating to a first elevated temperature under a first inert gas containing atmosphere, contacting the catalyst with a treating gas mixture comprising a second inert gas, a reductant, and an adsorbate at a second elevated temperature to produce a treated catalyst, and removing the treating gas mixture;
   contacting the treated catalyst with a gaseous carbon source, optionally carried by a third inert gas, and
   producing at least 70% metallic single-wall carbon nanotubes, wherein the second inert gas comprises He.

2. The method according to claim 1, wherein the first elevated temperature comprises a temperature of at least about 500° C.

3. The method according to claim 1, wherein the treated Fe-containing catalyst comprises particles having an average particle diameter ranging from about 0.2 nm to about 5 nm.

4. The method according to claim 1, wherein the treated Fe-containing catalyst comprises particles having an average particle diameter ranging from about 0.9 nm to about 1.4 nm.

5. The method according to claim 1, wherein the second elevated temperature comprises a temperature of at least about 800° C.

6. The method according to claim 1, wherein the second inert gas comprises He, the reductant comprises $H_2$, and the adsorbate comprises water.

7. The method according to claim 1, wherein the gaseous carbon source comprises at least one member selected from the group consisting of methane, ethane, propane, butane, pentane, and mixtures thereof.

8. The method according to claim 1, wherein the gaseous carbon source comprises methane.

9. The method according to claim 1, wherein the first, second and third inert gases comprise He.

10. A method of producing metallic single-wall carbon nanotubes comprising
providing a plurality of carbon nanotube producing catalyst particles,
treating the plurality of carbon nanotube producing catalyst particles by contacting the plurality of carbon nanotube producing catalyst particles with a mixture comprising He gas, a reductant, and an adsorbate at an elevated temperature to obtain a treated plurality of carbon nanotube producing catalyst particles,
providing a gaseous carbon source,
contacting the gaseous carbon source with the treated plurality of carbon nanotube producing catalyst particles, and
producing the metallic single-wall carbon nanotubes.

11. The method according to claim 10, wherein the elevated temperature comprises a temperature greater than about 800° C.

12. The method according to claim 10, wherein the reductant comprises $H_2$.

13. The method according to claim 10, wherein the adsorbate comprises at least one member selected from the group consisting of $H_2O$, CO, and $O_2$.

14. The method according to claim 13, wherein the adsorbate comprises $H_2O$.

15. The method according to claim 10, wherein the carbon nanotube producing catalyst comprises an Fe-containing catalyst.

16. The method according to claim 10, wherein the treated plurality of carbon nanotube producing catalyst particles comprises a particle size ranging from about 0.2 nm to about 5 nm.

17. The method according to claim 10, wherein the treated plurality of carbon nanotube producing catalyst particles comprises a particle size ranging from about 0.9 nm to about 1.4 nm.

18. A method of preparing metallic single-wall carbon nanotubes comprising
dispersing a catalyst on a silica substrate,
treating the catalyst by heating to a first elevated temperature under a first inert gas containing atmosphere, contacting the catalyst with a treating gas mixture comprising He, a reductant, and an adsorbate at a second elevated temperature to produce a treated catalyst, and removing the treating gas mixture;
contacting the treated catalyst with a gaseous carbon source carried by He gas, and
producing at least 70% metallic single-wall carbon nanotubes.

19. The method according to claim 18, wherein the reductant comprises $H_2$, and the adsorbate comprises at least one member selected from the group consisting of $H_2O$, CO, and $O_2$.

20. The method according to claim 18, wherein the gaseous carbon source comprises at least one member selected from the group consisting of methane, ethane, propane, butane, pentane, and mixtures thereof.

* * * * *